Oct. 15, 1929.  B. FORD  1,732,158
STORAGE BATTERY CELL CLOSURE
Filed Dec. 6, 1924
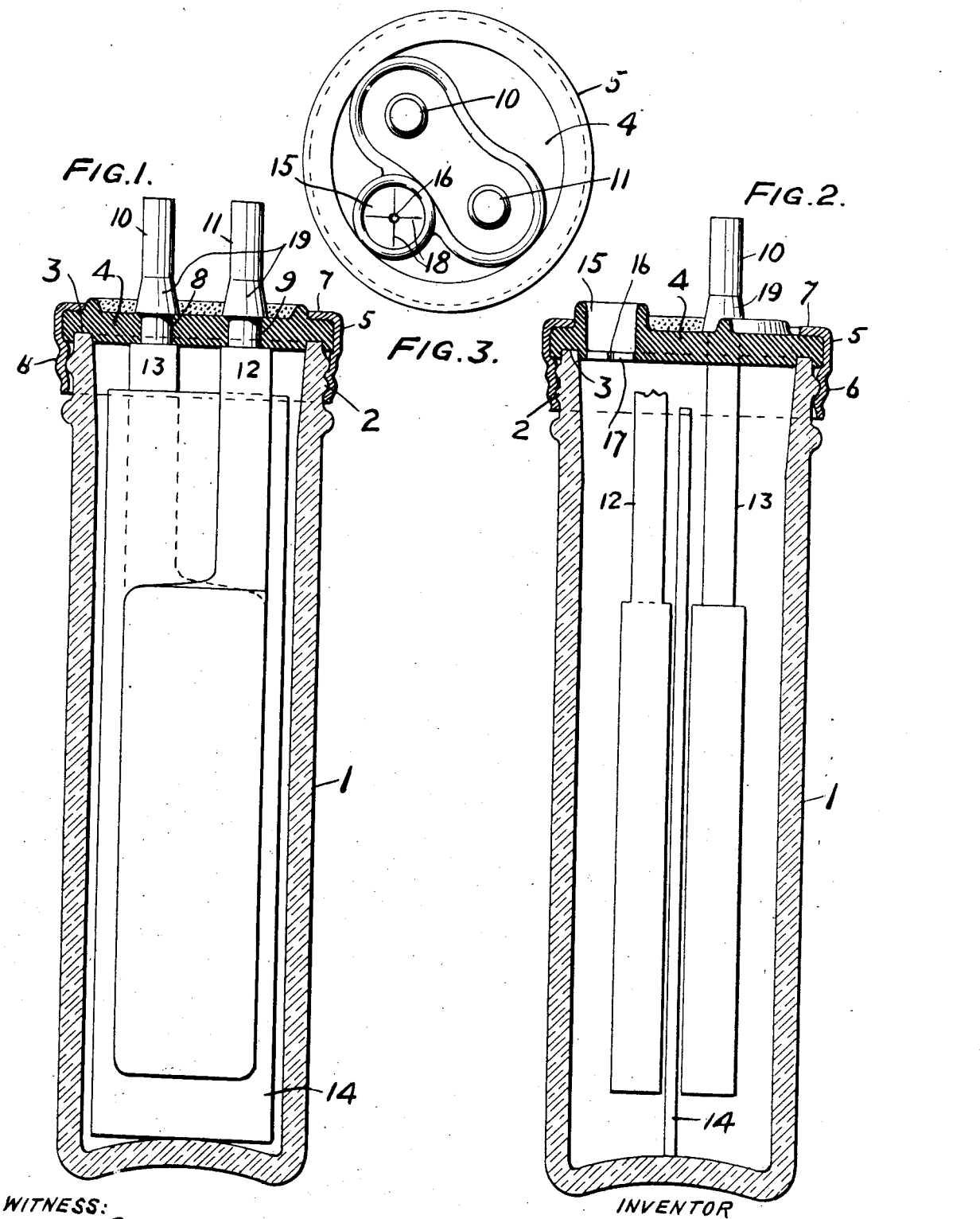
WITNESS:
Rob R Kitchel
INVENTOR
Bruce Ford
BY
Augustus B. Stoughton.
ATTORNEY.

Patented Oct. 15, 1929

1,732,158

UNITED STATES PATENT OFFICE

BRUCE FORD, OF PHILADELPHIA, PENNSYLVANIA

STORAGE-BATTERY-CELL CLOSURE

Application filed December 6, 1924. Serial No. 754,240.

My invention relates to closures for storage battery cells, and particularly to cells in which the element is assembled in a cylindrical jar.

Objects of the invention are to provide a closure of inexpensive design, easy to assemble, and adapted to afford a tight seal between the top of the jar and the cover. Other objects of the invention will be apparent from the following description which will be given in connection with one embodiment of my invention, and at the end of the description the invention will be claimed.

In the accompanying drawings

Figure 1 is a sectional elevation of a cell embodying features of the invention and showing a face view of the plates.

Fig. 2 is a sectional elevation taken at right angles to that of Figure 1, and

Fig. 3 is a top view of the cell.

In the drawings 1 is a container of cylindrical form which may be of any suitable material, such as glass, and which is provided at the top with external screw threads 2. The upper surface or edge 3 of the container is flat, as by grinding, to make a tight seal with the cover 4. The cover 4 is of a suitable elastic, resilient or yielding material, such as soft rubber, and it is provided on its under face with a circular groove, adapted to receive the upper edge 3 of the container and to make a tight seal therewith. The cover 4 is held in position and firmly pressed or clamped on the container by means of a rigid collar or ring 5 of hard rubber, lead alloy, or other suitable rigid material, which has a cylindrical body 6, provided with internal screw threads adapted to engage with the threads 2 at the top of the container. The ring 5 also includes an inwardly projecting ledge or flange 7 adapted to fit over the outer edge or marginal portion of the face of the cover 4, so that when the ring 5 is screwed down it will firmly clamp the cover 4 against the upper edge of the container 1, thus producing a tight seal. The cover 4 is provided with two openings 8 and 9 to receive the terminal posts 10 and 11 of the plates of the cell. The plates themselves are shown at 12 and 13, and are separated by a suitable separator 14.

The cover 4 is also provided with a vent opening 15 of cylindrical shape, partly closed by a diaphragm 17 at the bottom. This diaphragm is provided with a small central opening or perforation 16. The diaphragm 17 is divided into four sectors by slits 18, permitting the filling tube or hydrometer syringe to be inserted into the cell. It will be noted that this diaphragm in its normal position almost completely closes the cell, thus reducing evaporation of the electrolyte to a minimum, but permits a tube of comparatively large diameter to be inserted therethrough when necessary.

The terminal posts 10 and 11 are provided with a reduced section or surrounding groove at the point where they pass through the openings 8 and 9 in the cover, above which is a portion 19 conical in shape and tapering upward, permitting the posts to be pushed through the cover from below, forming an elastic seal, and to be supported from the cover when in normal position as shown.

In assembling the cell the plates are assembled in the cover as described above, the separator inserted between them and the element thus assembled placed in position on top of the container. The ring collar 5 is then screwed in place and the assembly is completed.

I claim:

1. In combination a soft rubber cover having integral therewith a vent opening of area adapted for the insertion of a filling syringe, and a flexible diaphragm integral with the cover normally partly closing said opening and provided with slits to permit the insertion of said syringe.

2. In combination a cylindrical container having an open end and provided with a flat upper surface, a resilient cover closing said open end and overlying said surface and having a vent opening area adapted for the insertion of a filling syringe and having a flexible diaphragm normally partly closing said opening and provided with slits to permit the insertion of said syringe, and a collar having screw-thread engagement with the container and provided with an inward flange overlying the marginal portion of the cover and pressing the same against said flat upper surface.

3. In combination a cylindrical container having an open end, a resilient cover closing said open end and having a circular facial groove receiving the container wall at the open end, and a collar provided with an internal flange overlying the marginal portion of the cover and having screw-thread engagement with the container.

BRUCE FORD.